A. J. HALL.
CONTROL SYSTEM AND APPARATUS.
APPLICATION FILED APR. 4, 1914.
1,203,610.
Patented Nov. 7, 1916.
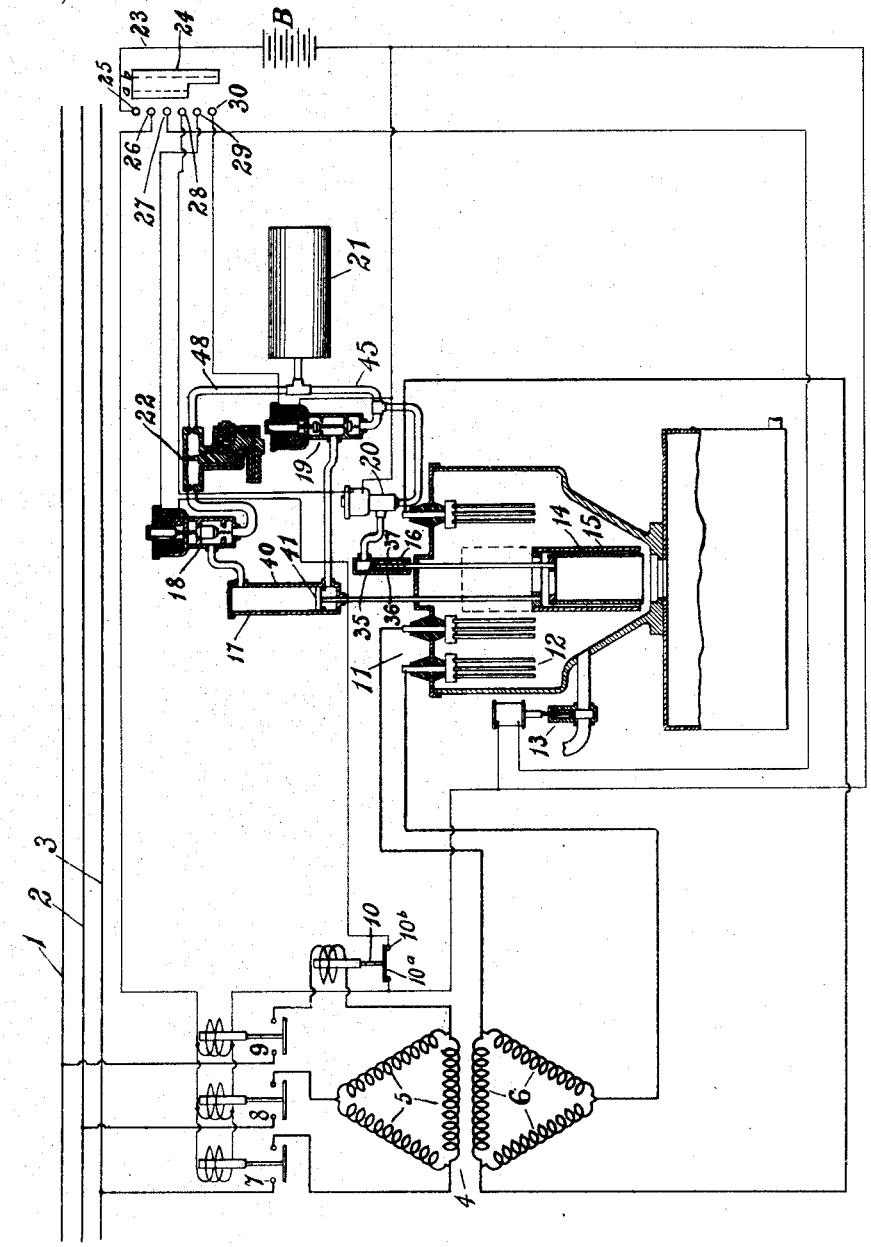

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM AND APPARATUS.

1,203,610.  Specification of Letters Patent.  Patented Nov. 7, 1916.

Application filed April 4, 1914. Serial No. 829,576.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems and Apparatus, of which the following is a specification.

My invention relates to apparatus and systems for controlling the operation of dynamo-electric machines, and it has special reference to power-actuated mechanisms for operating liquid rheostats and systems embodying the same.

One of the objects of my invention is to provide a simple system of control of the above-indicated character for governing the operation of polyphase induction motors through the agency of a liquid rheostat having a movable regulating valve for determining the level of the electrolyte which is actuated by a fluid-operated mechanism.

Another object of my invention is to provide a fluid-operated mechanism for a liquid rheostat which is adapted for operation in a vertical plane, and which is adapted to be moved by admission of an operating fluid to either of its ends or to be held stationary by the admission of operating fluid to both its ends.

More specifically, it is the object of my invention to provide means for supplying an operating fluid to the upper end of a balanced pressure mechanism, such as referred to, the pressure of which shall be less than the pressure of the fluid supplied to the lower end of the mechanism by a predetermined amount, whereby allowance is made for the weight of the movable parts.

It is clear that, if a balanced pressure operating mechanism, such as hereinbefore mentioned, is operated in a vertical plane for the purpose of actuating a movable member and, if the pressure of the operating fluid supplied to both ends of the mechanism is equal, it will be impossible to arrest the movement of the mechanism and maintain it in any desired position, for the reason that the action of gravity upon the movable parts disturbs the balanced pressure conditions and causes a downward movement.

According to my invention, I propose to provide means, preferably in the form of a reducing valve, for making allowance for the action of gravity on the movable parts and supplying reduced pressure to the upper end of the operating mechanism.

The single figure of the accompanying drawing is a diagrammatic view of a system of control embodying my invention.

Referring to the drawing, the system shown comprises a plurality of supply circuit conductors 1, 2, 3, a polyphase induction motor 4 having primary windings 5 and secondary windings 6, a plurality of line switches 7, 8 and 9 for connecting the primary windings 5 to the supply conductors 1, 2 and 3, a current relay 10 traversed by the primary motor current, a liquid rheostat 11 having a plurality of sets of electrodes 12 that are connected to the secondary windings 6 of motor 4 for governing the operation of the motor 4, and an inlet valve 13 for controlling the admission of electrolyte into the rheostat, a discharge valve 14 for governing the discharge thereof, a regulating valve 15 adapted to be raised and lowered in order to fix the height of the electrolyte, an operating device 16 for actuating the discharge valve 14, a balanced-pressure operating mechanism 17 for effecting the actuation of the regulating valve 15, a plurality of electrically operated valves 18 and 19 for governing the operation of the mechanism 17, an electrically operated valve 20 for controlling the operating device 16, a reservoir 21 for containing operating fluid under a predetermined pressure, a valve 22 for reducing the pressure of the fluid supplied to the upper end of the operating mechanism 17, a master controller 23 comprising a movable contact segment 24 and a plurality of stationary contact terminals 25 to 30, inclusive, and a battery B, or other suitable source of energy.

The liquid rheostat 11 may be of any well-known construction, and its discharge valve 14 and regulating valve 15 are tubular in form and concentrically disposed. The operating device 16 comprises a cylinder 35 and a movable piston 36 which is mechanically connected to the discharge valve 14 and is normally maintained in its upper position by a spring 37. The operating mechanism 17 comprises a cylinder 40 and a movable piston 41 contained therein and adapted to be raised and lowered in a vertical plane, the piston being mechanically associated with the regulating valve 15. The control valve 19 is interposed in a supply pipe 45 which communicates between the main reservoir 21 and the lower end of the cylinder 40 and said valve is maintained closed, when deenergized, while establishing communication between the lower end of the cylinder 40 and the atmosphere. The control valve 18 and the reducing valve 22 are both connected in a supply pipe 48 between the main reservoir 21 and the upper end of the cylinder 40. The valve 18 is normally held in its open position, when deënergized, to admit operating fluid to the cylinder 40, whereby the piston 41 and the associated regulating valve 15 are biased to their lowest position.

The reducing valve 22 may be of any well-known construction and is adapted to effect a reduction in the pressure of the operating fluid that is supplied to the upper end of the operating mechanism 17. Since devices of this type are old and familiar to those skilled in the art, no description of the construction and mode of operation will be given.

The reducing valve 22 is, of course, adjusted to make proper allowance for the action of gravity upon the movable piston 41 and its associated parts. For purposes of discussion, it may be assumed that the normal pressure of the operating fluid within the reservoir 21 is 85 lbs., while the reducing valve 22 is adapted to effect a reduction of 10 lbs., whereby the pressure of the fluid admitted above the piston 41 is substantially 75 lbs., while that acting upon the lower side of the piston 41 is 85 lbs. If then, the adjustment of the reducing valve 22 is made to properly correct for the action of gravity, the movable parts may be held stationary at any position by admitting operating fluid to both ends of the cylinder 40.

Assuming the circuit connections to be as shown, the operation of the system is as follows, the enumeration of all of the circuit conductors being omitted for the sake of simplicity: The master controller 23 is first moved to its position $a$ in which a circuit is completed from the positive terminal of the battery B through contact terminals 25 and 26—which are bridged by the movable segment 24—and energizing coils of the line switches 7, 8 and 9, to the negative side of the battery. Concurrently, another circuit is established from a contact terminal 27 which includes the energizing coil of the inlet valve 13 to the battery, while a third circuit from contact terminal 28 traversing the energizing coil of the control valve 20 to the battery, is established. Thereupon, the line switches 7, 8 and 9 are closed to deliver energy to the primary windings 5 of the motor 4, the inlet valve 13 is opened and the discharge valve 14 is closed. Under these conditions, electrolyte is admitted into the rheostat and rises to a height corresponding to the upper end of the regulating valve 15, at which level the tips of the electrodes 12 are immersed. Thus, a circuit is completed through the secondary motor windings 6, and the motor is started into operation. In order to bring the motor 6 up to speed, the master controller 23 is moved to its position $b$ in which a circuit is completed from contact terminal 29 which includes the energizing coil of control valve 18 and coöperating switch members 10$^a$ and 10$^b$ of the current relay 10 to the negative terminal of the battery. Another circuit is also completed from the contact terminal 30 through the energizing coil of the control valve 19 to the battery. Upon the completion of circuits just recited, valve 18 is opened and valve 19 closed to respectively release the operating fluid from the upper end of the cylinder 40 and to admit it to the lower end thereof. The piston 41 is, therefore, moved upwardly and concurrently raises the regulating valve 15 which permits the level of the electrolyte to be raised accordingly. This action continues until the motor current traversing the energizing coil of the current relay 10 exceeds the value for which the relay is adjusted, in which case it effects the disengagement of its coöperating switch members 10$^a$ and 10$^b$ and deënergizes the valve 18. The valve 18 is immediately opened to admit fluid to the upper end of the cylinder 40, whereby balanced pressure conditions obtain, and the piston 41 and its associated regulating valve 15 are held stationary in the positions which they occupy. When the motor current falls to a predetermined safe value, the current relay 10 completes the circuit through the energizing coil of the valve 18 which is again closed to the source of operating fluid and permits the escape of fluid from above the piston 41. Unbalanced pressure conditions thus result, and the piston 41 and regulating valve 15 are again raised.

Although I have shown and described my invention in connection with a particular type of control system and class of apparatus, it is evident that my invention is equally applicable to widely different systems and devices and I, therefore, desire that only such limitations shall be imposed as are indicated in the appended claims.

I claim as my invention:

1. The combination with a movable member and a fluid-operated device for actuating said movable member, and means for admitting operating fluid to both ends of said device, of means for reducing the pressure of the operating fluid admitted to one end thereof.

2. The combination with a movable member, and a fluid-operated device for actuating said movable member, of means for admitting operating fluid at different pressures to the respective ends of said device.

3. The combination with a movable member and a fluid-operated device for actuating said movable member, and a source of operating fluid, of valves for governing the admission of operating fluid to the respective ends of said device, and means associated with the source of fluid for reducing the pressure of the fluid admitted to one end of said device.

4. A fluid-operated device comprising a movable member adapted to be actuated in opposite directions, a receptacle in which said member is disposed, a source of operating fluid, and means for admitting operating fluid at different pressures to the respective ends of said device.

5. A fluid-operated device comprising a vertically disposed operating cylinder, a movable piston disposed therein, and means for admitting operating fluid at a lower pressure to the upper end of said cylinder than to the lower end thereof.

6. The combination with a movable member and a fluid-operated device for actuating said member in a vertical plane comprising an operating cylinder and a movable piston disposed therein, of means for admitting an operating fluid to either end of said cylinder for actuating said piston and for admitting operating fluid to both ends of said cylinder for arresting movements of said piston, the pressure of the operating fluid admitted to the upper end of said cylinder being less than that admitted to the lower end thereof.

7. The combination with a movable member and a fluid-operated device for actuating said member in a vertical plane comprising an operating cylinder and a movable piston disposed therein, of a source of operating fluid, a plurality of valves severally associated with the respective ends of said cylinder for admitting fluid to either end thereof for moving said piston and to both ends thereof for arresting its movement, and means associated with said source of fluid for reducing the pressure of the fluid admitted to the upper end of said cylinder.

8. The combination with a movable member and a fluid-operated device for actuating said member in a vertical plane comprising an operating cylinder and a movable piston disposed therein, of a source of operating fluid, a plurality of valves severally associated with the respective ends of said cylinder for admitting fluid to either end thereof for moving said piston and to both ends thereof for arresting its movement, and a reducing valve associated with said source of fluid for reducing the pressure of the fluid admitted to the upper end of said piston, whereby allowance is made for the weight of the moving parts.

9. The combination with a movable member and a fluid-operated device comprising a cylinder and a movable piston disposed therein and adapted for movements in a vertical plane, of means for admitting operating fluid to both sides of said piston to hold it against movement, the pressure of the fluid acting upon the upper side of said piston being less than that upon the lower side thereof.

10. The combination with a movable member and a fluid-operated device comprising a cylinder and a movable piston disposed therein and adapted for movements in a vertical plane, of means for admitting operating fluid to both sides of said piston to hold it against movement, the pressure of the fluid acting below said piston being greater than that above it to counteract for the weight of the movable parts.

11. The combination with a liquid rheostat adapted to be filled with electrolyte, a regulating valve for fixing the level of the electrolyte, and a fluid-operated device for raising and lowering said valve, of means for utilizing operating fluids of different pressure for raising and lowering said valve.

12. The combination with a liquid rheostat adapted to be filled with electrolyte, a regulating valve for fixing the level of the electrolyte and a fluid-operated device for raising and lowering said valve, of means for utilizing operating fluid in the upper end of said device of less pressure than in the lower end thereof, whereby uniform operation may be secured in both directions of movement and the valve may be held stationary at any height.

13. The combination with a fluid-operated device comprising a cylinder and a piston disposed therein and adapted to be raised and lowered, and a plurality of fluid supply pipes severally associated with the upper and lower ends of said cylinder, of means associated with said supply pipes for governing the admission of operating fluid to said cylinder, and a pressure-reducing valve interposed in the pipe to the upper end of the cylinder.

14. The combination with a movable member and a fluid-operated device for actuating said movable member, of a plurality of valves for governing the admission and release of operating fluid to and from the respective ends of said device, and other means separate and independent of said valves for reducing the pressure of the operating fluid admitted to the one end thereof.

15. The combination with a movable member biased by gravity to a predetermined position, and a fluid-operated device for actuating said movable member, of means coöperating with said fluid-actuated means for balancing the action of gravity.

In testimony whereof, I have hereunto subscribed my name this 31st day of March, 1914.

ARTHUR J. HALL.

Witnesses:
C. C. WHITTAKER,
B. B. HINES.

Copies of this patent may be obtained for five cents each, by addressing the "Commissioner of Patents, Washington, D. C."